Patented May 15, 1945

2,375,915

UNITED STATES PATENT OFFICE 2,375,915

PROCESS FOR THE PREPARATION OF ANHYDROUS COMPOUNDS OF THE PENTITOLS

Felix Grandel, Emmerich, Rhine, Germany; vested in the Alien Property Custodian

No Drawing. Application November 26, 1940, Serial No. 367,300. In Germany December 9, 1939

2 Claims. (Cl. 260—333)

The preparation of anhydrous compounds of the hexitols by distillation in the presence of catalysers, is already known. Anhydrous compounds of the pentitols, however, have not yet been prepared.

It has now been found by applicant that pentitols can be transformed into anhydrous compounds, if the pentitols are heated to higher temperatures, and/or are treated with catalysers which promote the splitting-off of water. Methionic acid is particularly well suited for use as a catalyser in the carrying out of the process of the present application.

As the result of the reduction in the size of the molecules due to the splitting-off of water, the anhydrous compounds are readily distillable. In the process of preparing anhydrous pentitols under the process of the present application the conditions of work are to be selected in such a way that a too extensive and undesirable splitting-off of water in the direction towards furfurol is prevented.

The anhydrous pentitols are capable of ready esterification with acid. They can be advantageously used as esterifying agents in the fat and lacquer industries, as softening agents in the varnish industry, are well adapted for use in the manufacture of printing cylinders and oil cloth, are useful in the motor car industry as a material for the protection of the engine cooling system from low temperatures, can be used as basic material for ointments in the pharmaceutical and cosmetic industries, etc. For lack of more appropriate term "xylitol mono-anhydride" has been used in referring to monomeric xylitol deprived of one mole of water only, and "xylitol di-anhydride" has been used in referring to monomeric xylitol deprived of two mols of water only.

Examples 1. 60 milligrams of methionic acid are mixed with 60 grams of xylitol,

CH$_2$OH.HCOH.HOCH.HCOH.CH$_2$OH whereupon the mixture is stirred for two hours at ordinary temperature, is then heated up to 50° to 70° C. for one hour, and is thereafter cooled down to room temperature, whereupon the water is distilled off, at first in vacuo, and later-on at a still further reduced pressure (a high vacuum of 3 to 5 millimeters of Hg). The residue is passed through a high-vacuum distillation process, in the course of which, in addition to but a small quantity of fore-shot, the anhydrous compounds will come over at 218° C. and 8 millimeters of Hg as a fair and viscid oil.

2. 50 grams of xylitol are heated up to 120° C. for one hour together with 2% of coal. This heated mixture of xylitol and coal, while still hot, is quickly distilled off in vacuo at a 5 mm. column. After fractionation, one will obtain:

Xylitol mono-anhydride B.P. 207° C. 5 mm. Hg 34 g.=68%
Xylitol di-anhydride B.P. 170° C. 5 mm. Hg 3 g.=5%

Both of these compounds are a fair and viscid oil of yellowish shade.

3. 50 grams of xylitol are quickly heated in vacuo up to 250° C. as a minimum, with 5% of ZnCl$_2$. An oil mixture, light-brown in color, will pass over, from which, after fractionation, the following will be obtained:

Xylitol mono-anhydride B.P. 207° C. 5 mm. Hg 20 g.=40%
Xylitol di-anhydride B.P. 170° C. 5 mm. Hg 10 g.=20%

Other catalyzers, e. g. aluminum oxide, which do not display their effect in the gaseous phase, can also be used as catalyzing agents instead of the methionic acid, coal and chloride of zinc set forth in the above examples.

What I claim is:

1. A process for the dehydration of pentitols comprising heating the pentitols to a temperature of from 50 to 70° C. in the presence of methionic acid, cooling the mixture of pentitols and methionic acid, and distilling water therefrom under a vacuum.

2. A process for the dehydration of xylitol comprising heating the xylitol to a temperature of from 50 to 70° C. in the presence of methionic acid, cooling the mixture of xylitol and methionic acid, and distilling water therefrom under a vacuum.

FELIX GRANDEL.